(12) United States Patent
Wandner et al.

(10) Patent No.: US 12,454,094 B2
(45) Date of Patent: Oct. 28, 2025

(54) ADDITIVE MANUFACTURING PROCESS USING A BUILDING MATERIAL THAT CONTAINS METAL-OXIDE COATED MICA

(71) Applicant: Stratasys, Inc., Eden Prairie, MN (US)

(72) Inventors: Derk Wandner, Odenthal (DE); Ting Liu, Cologne (DE); Jonas Kuenzel, Leverkusen (DE)

(73) Assignee: Stratasys Inc., Eden Prairie, MN (US)

( * ) Notice: Subject to any disclaimer, the term of this patent is extended or adjusted under 35 U.S.C. 154(b) by 897 days.

(21) Appl. No.: 17/288,347

(22) PCT Filed: Oct. 21, 2019

(86) PCT No.: PCT/EP2019/078477
§ 371 (c)(1),
(2) Date: Apr. 23, 2021

(87) PCT Pub. No.: WO2020/083800
PCT Pub. Date: Apr. 30, 2020

(65) Prior Publication Data
US 2021/0379817 A1    Dec. 9, 2021

(30) Foreign Application Priority Data
Oct. 26, 2018  (EP) .................................. 18202734

(51) Int. Cl.
| | | |
|---|---|---|
| *B29C 64/118* | (2017.01) | |
| *B33Y 70/00* | (2020.01) | |
| *C08K 3/34* | (2006.01) | |
| *C08K 5/5313* | (2006.01) | |
| *C08L 23/26* | (2006.01) | |
| *C08L 69/00* | (2006.01) | |
| *B29K 23/00* | (2006.01) | |
| *B29K 69/00* | (2006.01) | |

(52) U.S. Cl.
CPC ............ *B29C 64/118* (2017.08); *B33Y 70/00* (2014.12); *C08K 3/34* (2013.01); *C08K 5/5313* (2013.01); *C08L 23/26* (2013.01); *C08L 69/00* (2013.01); *B29K 2023/06* (2013.01); *B29K 2023/10* (2013.01); *B29K 2023/18* (2013.01); *B29K 2069/00* (2013.01)

(58) Field of Classification Search
CPC ..................................................... B29C 64/118
See application file for complete search history.

(56) References Cited

U.S. PATENT DOCUMENTS

| | | | | |
|---|---|---|---|---|
| 4,420,584 A | * | 12/1983 | Rawlings | C08K 7/14 |
| | | | | 524/502 |
| 6,989,190 B2 | * | 1/2006 | Gaggar | C08L 67/02 |
| | | | | 524/439 |
| 11,485,853 B2 | * | 11/2022 | Wandner | C08K 5/524 |
| 2021/0198482 A1 | * | 7/2021 | Wandner | C08L 25/14 |
| 2023/0407044 A1 | * | 12/2023 | Wehrmann | C09C 1/0015 |

FOREIGN PATENT DOCUMENTS

| | | | |
|---|---|---|---|
| CN | 1346389 A | | 4/2002 |
| CN | 101490190 A | | 7/2009 |
| CN | 102627827 A | * | 8/2012 |
| CN | 103874734 A | | 6/2014 |
| EP | 3395898 A1 | | 10/2018 |
| WO | 00/58408 A1 | | 10/2000 |
| WO | 2008/009516 A2 | | 1/2008 |
| WO | 2013/045552 A1 | | 4/2013 |
| WO | 2018/149831 A1 | | 8/2018 |

OTHER PUBLICATIONS

Machine translation of CN102627827A, Aug. 8, 2012 (Year: 2012).*
International Preliminary Report on Patentability received for PCT Patent Application No. PCT/EP2019/078477, mailed on May 6, 2021, 15 pages (9 pages of English Translation and 6 pages of Original Document).
International Search Report and Written Opinion received for PCT Patent Application No. PCT/EP2019/078477, mailed on Nov. 22, 2019, 17 pages (8 pages of English Translation and 9 pages of Original Document).

* cited by examiner

*Primary Examiner* — Benjamin A Schiffman
(74) *Attorney, Agent, or Firm* — Faegre Drinker Biddle & Reath LLP

(57) ABSTRACT

The present invention relates to a method of producing an article, comprising the step of producing the article by means of an additive manufacturing method from a build material comprising an aromatic polycarbonate and interference pigments and/or pearlescent pigments from the group of the metal oxide-coated micas. The invention likewise relates to an article obtainable by the method. The build material further comprises ≥0.05% by weight to ≤3% by weight of anhydride-modified α-olefin polymer.

11 Claims, No Drawings

ADDITIVE MANUFACTURING PROCESS USING A BUILDING MATERIAL THAT CONTAINS METAL-OXIDE COATED MICA

CROSS-REFERENCE TO RELATED APPLICATIONS

This application is a National stage application (under 35 U.S.C. § 371) of PCT/EP2019/078477, filed Oct. 21, 2019, which claims benefit of European Application No. 18202734.2, filed Oct. 26, 2018, both of which are incorporated herein by reference in their entirety.

FIELD OF THE INVENTION

The present invention relates to a method of producing an article, comprising the step of producing the article by means of an additive manufacturing method from a build material comprising an aromatic polycarbonate and interference pigments and/or pearlescent pigments from the group of the metal oxide-coated micas. The invention likewise relates to an article obtainable by the method.

BACKGROUND

The use of polycarbonates in additive manufacturing methods ("3D printing methods") is known in principle. For instance, WO 2015/077053 A1 discloses an article having reduced density, comprising a thermoplastic polycarbonate composition. The article has a density (ASTM D792-00) of 80% to 99%, based on the weight of a similar solid injection molding without voids. In addition, the article has a microstructure, determined by optical microscopy, with 1% by volume to 20% by volume of voids, wherein at least 80% of the voids are those having a high ratio of length to width and less than 20% of the voids are spherical voids having a diameter between 10 and 100 micrometers. The thermoplastic polycarbonate composition comprises at least 50 mol % of bisphenol A and has a weight-average molecular weight ($M_w$) of 10 000 to 50 000 g/mol, a glass transition temperature Tg of 130° C. to 180° C., a content of phenolic OH groups of less than 50 ppm, a halogen group content of below 100 ppm and a diaryl carbonate content of less than 1% by weight. The article is manufactured by means of a monofilament-based additive manufacturing technique.

WO 2015/195527 A1 relates to a method of producing a thermoplastic article in which a multitude of layers of a thermoplastic material is laid out in a predetermined pattern in order to form the article. The thermoplastic material comprises a thermoplastic composition having a melt flow index of 30 grams/10 minutes to 75 grams/10 minutes to ASTM D1238-04 at either 230° C. and 3.8 kg or at 300° C. and 1.2 kg. The thermoplastic material may be a polycarbonate homopolymer, a polycarbonate copolymer, a polyester or a combination thereof.

WO 2015/193818 A1 discloses a method of producing an article, in which one or more layers of an extruded material in the molten state are laid out in a predetermined pattern, wherein at least one of the layers is formed from a build material. The build material is exposed to an effective dose of ultraviolet radiation in order to trigger crosslinking within the article. The build material here is a polymeric composition comprising a crosslinkable polycarbonate resin with a photoactive group derived from a benzophenone.

WO 2012/080397 A2 discloses an infrared radiation (IR)-absorbing polymer composition comprising a transparent thermoplastic, an inorganic infrared absorber, also referred to hereinafter as TR absorber, optionally an inorganic nanoscale pigment and the combination of at least one organic colorant of specific structure, and the production and use of the polymer compositions and the products produced therefrom.

WO 2005/090056 A1 relates to a pulverulent composition for processing in a method of layer-by-layer building of three-dimensional articles by means of a laser, in which regions of the respective powder layer are selectively melted, wherein that the powder includes at least one polymer and at least one absorber, wherein a laser having a wavelength between 100 and 3000 nm may be used.

Effect pigments are added to polycarbonate compositions in some cases in order to influence the appearance of the compositions by means of angle-dependent changes in hue and/or gloss. Effect pigments are platelet-shaped and bring about directed reflection and/or interference. There are various groups of effect pigments: Metal effect pigments, interference pigments and pearlescent pigments, although the boundaries particularly between the latter can be fluid and these are therefore also referred to collectively as "special effect pigments".

Pearlescent pigments comprise transparent platelets having high refractive index. Multiple reflection gives rise to a pearl-like effect. Coloring in the case of interference pigments, which may be either transparent or opaque, is based primarily on interference.

The pearlescent pigments and/or interference pigments especially also include metal oxide-coated mica pigments, which are employed in various sectors, for instance for housings of numerous domestic appliances or consumer electronics devices or as a design element in the architectural sector. Pearlescent effects and/or interference pigments of this kind are available inter alia under the "Magnapearl®" or "Mearlin®" names from BASF SE or under the "Iriodin®" or "Candurin®" names from Merck SE.

When used in polycarbonate compositions, pearlescent pigments or interference pigments from the group of the metal oxide-coated micas typically lead to significant degradation of the polycarbonate, which is manifested in a reduction in the molecular weight and an associated reduction in the viscosity and hence increase in the melt volume flow rate MVR and deterioration in the mechanical properties. The degradation processes also lead to discoloration of the material.

In the compositions available on the market, the degradation processes are taken into account in that the polycarbonate is used with higher molecular weight than required for the actual application. The target molecular weight is then attained via the compounding and injection molding or extrusion processes at elevated temperature. Further parameters in the compounding process, such as the control of the energy input or the arrangement of the metering point for the effect pigment, also have a significant effect on the molecular weight of the polycarbonate that ultimately arises. However, it is found here that targeted control of the molecular weight is problematic.

An option in principle for minimizing the degradation of polycarbonate is the use of thermal stabilizers. For thermal stabilization of polycarbonate, it is customary to add essentially suitable organic phosphorus compounds such as aromatic phosphines, aromatic phosphites and organic antioxidants, especially sterically hindered phenols. There are frequent descriptions of the use of phosphites in combination with sterically hindered phenols, for instance in EP 0 426 499 A1. However, in the case of the effect pigments described, stabilization by phosphites only is insufficient.

The thermal decrease in molecular weight of polycarbonates is of particular relevance with regard to build materials for additive manufacturing methods, since the material is subjected to repeated thermal stress. For example, for FDM methods, an extruded filament is provided, which is then melted again in the actual 3D printing.

WO 2018/197572 A1 discloses a composition comprising A) 50% by weight to 98.5% by weight of aromatic polycarbonate and B) 0.8% by weight to ≤3.0% by weight of interference pigment and/or pearlescent pigment from the group of the metal oxide-coated micas and C) 0.05% by weight to ≤3% by weight of anhydride-modified α-olefin polymer. However, there is no description of the use of this material in 3D printing.

DETAILED DESCRIPTION

Polycarbonates have a low degree of crystallinity, a comparatively high melting temperature and a glass transition temperature well above room temperature. However, this combination of properties entails specific challenges for the use of polycarbonates in additive manufacturing methods. These are especially the adhesion of individual strand or particle layers to one another.

It is an object of the present invention to overcome, at least to some extent, at least one disadvantage of the prior art. It is a further object of the present invention to specify an additive manufacturing method by which polycarbonate-based build materials containing pearlescent and/or interference pigments can be processed with satisfactory adhesion of the individual layers to one another.

The object is achieved in accordance with the invention by a method as claimed in claim 1. An article obtainable by the method of the invention is claimed. Advantageous developments are specified in the dependent claims. They can be combined in any desired manner, unless the opposite is clearly apparent from the context.

A method of producing an article comprises the step of producing the article by means of an additive manufacturing method from a build material, wherein the build material, based on the total weight of the build material, comprises A) ≥50% by weight to ≤98.5% by weight of aromatic polycarbonate, B) ≥0.8% by weight to ≤3.0% by weight of interference pigment and/or pearlescent pigment from the group of metal oxide-coated micas and C) ≥0.05% by weight to ≤3% by weight of anhydride-modified α-olefin polymer, where the sum total of the percentages by weight of A), B) and C) is ≤100% by weight.

The article to be produced may be the sole aim of the production method. Alternatively, it is possible that the article to be produced is part of a larger composite and the production thereof constitutes a component step in the production of the composite.

According to the invention, the article is produced from a build material by means of an additive manufacturing method ("3D printing"). The additive manufacturing method may be selected, for example, from melt coating (fused filament fabrication, FFF, or fused deposition modelling, FDM), selective laser sintering, selective laser melting or high-speed sintering.

The term "melt-layering method" refers to a manufacturing method from the field of additive manufacturing, by which a workpiece is formed layer-by-layer, for example from a meltable plastic. The plastic can be used with or without further additions such as fibers. Machines for FDM/FFF form part of the machine class of 3D printers. This method is based on the liquefaction of a plastic or wax material in wire form by heating. The material solidifies in the course of final cooling. The material is applied via extrusion, using a heated nozzle which is freely movable in relation to a manufacturing plane. It is possible here either for the manufacturing plane to be fixed and for the nozzle to be freely movable or for a nozzle to be fixed and a substrate table (with a manufacturing plane) to be movable, or for both elements, the nozzle and manufacturing plane, to be movable. The speed at which substrate and nozzle are movable with respect to one another is preferably within a range from 1 to 200 mm/s. The layer thickness is within a range from 0.025 and 1.25 mm depending on the application; the exit diameter of the material jet (nozzle outlet diameter) from the nozzle is typically at least 0.05 mm.

The individual layers in layer-by-layer model production therefore become joined to one another to give a complex component. A body is typically built by repeatedly tracing a working plane in each case line by line (forming a layer) and then moving the working plane upward in a "stacking" manner (forming at least one further layer atop the first layer), so as to form a shape layer by layer. The exit temperature of the mixtures of material from the nozzle may, for example, be 200° C. to 320° C. It is additionally possible to heat the substrate table and/or any build chamber present, for example to 120° C. to 250° C. This can prevent excessively rapid cooling of the layer applied, such that a further layer applied thereto bonds adequately to the first layer.

In the context of the present invention, sintering methods are methods which especially utilize thermoplastic powders in order to build articles layer by layer. In this case, thin layers of powder are applied by means of what is called a coater and then selectively melted by means of an energy source. The surrounding powder here supports the component geometry. Complex geometries can thus be manufactured more economically than in the FDM method. Moreover, different articles can be arranged or manufactured in a tightly packed manner in what is called the powder bed. Owing to these advantages, powder-based additive manufacturing methods are among the most economically viable additive manufacturing methods on the market. These methods are therefore used predominantly by industrial users. Examples of powder-based additive manufacturing methods are what is known as laser sintering (SLS, selective laser sintering) or high-speed sintering (HSS). These differ from one another in the method used to introduce the selective-melting energy into the plastic. In the case of the laser sintering method, the energy is introduced by way of a deflected laser beam. In what is called the high-speed sintering (HSS) method, the energy is introduced via infrared (IR) sources in combination with an IR absorber selectively printed into the powder bed. The method known as selective heat sintering (SHS) utilizes the printing unit of a conventional thermal printer for selective melting of thermoplastic powders. Preference is given to selective laser sintering methods (SLS).

Component A

Component A is aromatic polycarbonate. According to the invention, "polycarbonate" is understood to mean both homopolycarbonates and copolycarbonates. These polycarbonates may be linear or branched in the familiar manner. According to the invention, it is also possible to use mixtures of polycarbonates.

A portion of up to 80 mol %, preferably of 20 mol % to 50 mol %, of the carbonate groups in the polycarbonates used in accordance with the invention may be replaced by aromatic dicarboxylic ester groups. Polycarbonates of this type that incorporate not only acid radicals derived from carbonic acid but also acid radicals derived from aromatic dicarboxylic acids in the molecular chain are referred to as aromatic polyester carbonates. In the context of the present invention, they are covered by the umbrella term of thermoplastic aromatic polycarbonates.

The carbonate groups are replaced essentially stoichiometrically and also quantitatively by the aromatic dicarboxylic ester groups, and so the molar ratio of the coreactants is also reflected in the finished polyester carbonate. The aromatic dicarboxylic ester groups can be incorporated either randomly or blockwise.

In a preferred embodiment, the build material comprises a polycarbonate A) having a weight-average molecular weight $M_w$ of ≥10 000 g/mol to ≤40 000 g/mol. The molecular weight is determined by gel permeation chromatography in methylene chloride at 25° C. against polycarbonate standards.

The molecular weight is determined by means of gel permeation chromatography to DIN 55672-1:2007-08, calibrated against bisphenol A polycarbonate standards and using dichloromethane as eluent. In particular, $M_w$ is in the range from 10 000 g/mol to 35 000 g/mol, preferably from 12 000 g/mol to 32 000 g/mol, further preferably from 15 000 g/mol to 32 000 g/mol, especially from 20 000 g/mol to 31 500 g/mol. Calibration is effected with linear polycarbonates (formed from bisphenol A and phosgene) of known molar mass distribution from PSS Polymer Standards Service GmbH, Germany, calibration by method 2301-0257502-09D (2009, German language) from Currenta GmbH & Co. OHG, Leverkusen. The eluent is dichloromethane. Column combination of crosslinked styrene-divinylbenzene resins. Diameter of analytical columns: 7.5 mm; length: 300 mm. Particle sizes of column material: 3 μm to 20 μm. Concentration of solutions: 0.2% by weight. Flow rate: 1.0 ml/min, temperature of solutions: 30° C. Detection using a refractive index (RI) detector. Details of the production of polycarbonates have been set out in many patent specifications during the last approximately 40 years. Reference may be made here by way of example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718 and finally to U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299.

Preferred modes of preparation of the polycarbonates to be used in accordance with the invention, including the polyestercarbonates, are the known interfacial method and the known melt transesterification method (cf. e.g. WO 2004/063249 A1, WO 2001/05866 A1, WO 2000/105867, U.S. Pat. Nos. 5,340,905 A, 5,097,002 A, 5,717,057 A).

Aromatic polycarbonates are prepared, for example, by reaction of dihydroxyaryl compounds with carbonyl halides, preferably phosgene, and/or with aromatic dicarbonyl dihalides, preferably benzenedicarboxylic dihalides, by the interfacial method, optionally using chain terminators and optionally using trifunctional or more than trifunctional branching agents, with preparation of the polyester carbonates by replacing a portion of the carbonic acid derivatives with aromatic dicarboxylic acids or derivatives of the dicarboxylic acids, specifically with aromatic dicarboxylic ester structural units according to the carbonate structural units to be replaced in the aromatic polycarbonates. Likewise possible is preparation via a melt polymerization method, by reacting dihydroxyaryl compounds with diphenyl carbonate, for example.

Dihydroxyaryl compounds suitable for the production of polycarbonates are those of formula (1)

HO—Z—OH    (1)

in which

Z is an aromatic radical which has 6 to 30 carbon atoms and may comprise one or more aromatic rings, may be substituted and may comprise aliphatic or cycloaliphatic radicals or alkylaryls or heteroatoms as bridging elements.

Preferably, Z in formula (1) is a radical of the formula (2)

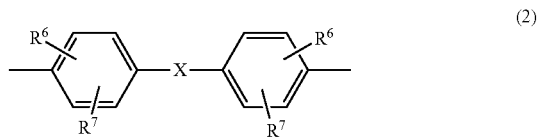

(2)

in which $R^6$ and $R^7$ are independently H, $C_1$ to $C_{18}$ alkyl, $C_1$ to $C_{18}$ alkoxy, halogen such as Cl or Br or are each optionally substituted aryl or aralkyl, preferably H or $C_1$ to $C_{12}$ alkyl, more preferably H or $C_1$ to $C_8$ alkyl, and very particularly preferably H or methyl, and X is a single bond, —$SO_2$—, —CO—, —O—, —S—, $C_1$ to $C_6$ alkylene, $C_2$ to $C_5$ alkylidene or $C_5$ to $C_6$ cycloalkylidene, which may be substituted by $C_1$ to $C_6$ alkyl, preferably methyl or ethyl, or else $C_6$ to $C_{12}$ arylene, which may optionally be fused with further heteroatom-containing aromatic rings.

X is preferably a single bond, $C_1$ to $C_8$ alkylene, $C_2$ to $C_5$ alkylidene, $C_5$ to $C_6$ cycloalkylidene, —O—, —SO—, —CO—, —S—, —$SO_2$— or is a radical of the formula (2a)

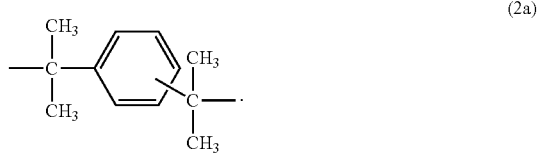

(2a)

Examples of dihydroxyaryl compounds suitable for the preparation of the polycarbonates are hydroquinone, resorcinol, dihydroxydiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes, phthalimidines derived from isatin derivatives or from phenolphthalein derivatives, and the related ring-alkylated, ring-arylated and ring-halogenated compounds.

Preferred dihydroxyaryl compounds are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethyl bisphenol A, bis(3,5-dimethyl-4-hydroxyphenyl)methane, 2,2-bis(3,5-dimethyl-4-hydroxyphenyl)propane, bis(3,5-dimethyl-4- hydroxyphenyl) sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane and also the bisphenols (I) to (III)

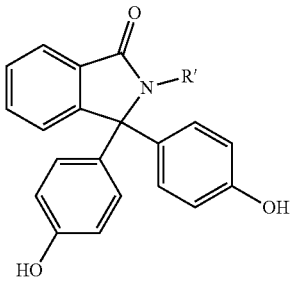

(I)

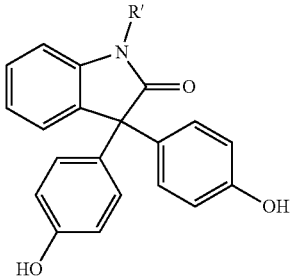

(II)

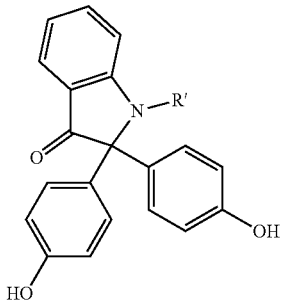

(III)

in which each R' is $C_1$- to $C_4$-alkyl, aralkyl or aryl, preferably methyl or phenyl, most preferably methyl.

Particularly preferred dihydroxyaryl compounds are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A and also the diphenols of formulae (I), (II) and (III).

These and other suitable dihydroxyaryl compounds are described by way of example in U.S. Pat. Nos. 3,028,635, 2,999,825, 3,148,172, 2,991,273, 3,271,367, 4,982,014 and 2,999,846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

In the case of homopolycarbonates only one dihydroxyaryl compound is used; in the case of copolycarbonates two or more dihydroxyaryl compounds are used. The dihydroxyaryl compounds used, similarly to all other chemicals and assistants added to the synthesis, may be contaminated with the contaminants from their own synthesis, handling and storage. However, it is desirable to use raw materials of the highest possible purity.

Examples of suitable carbonic acid derivatives are phosgene or diphenyl carbonate.

Suitable chain terminators that may be used in the preparation of the polycarbonates are monophenols. Examples of suitable monophenols are phenol itself, alkylphenols such as cresols, p-tert-butylphenol, cumylphenol, and also mixtures of these.

Preferred chain terminators are the phenols which have substitution by one or more linear or branched, preferably unsubstituted, $C_1$ to $C_{30}$-alkyl moieties, or by tert-butyl. Particularly preferred chain terminators are phenol, cumylphenol and/or p-tert-butylphenol.

The amount of chain terminator to be used is preferably 0.1 to 5 mol %, based on the number of moles of diphenols used in each case. The chain terminators can be added before, during or after the reaction with a carbonic acid derivative.

Suitable branching agents are the trifunctional or more than trifunctional compounds known in polycarbonate chemistry, in particular those having three or more than three phenolic OH groups.

Examples of suitable branching agents are 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra(4-(4-hydroxyphenylisopropyl)phenoxy)methane and 1,4-bis((4',4''-dihydroxytriphenyl)methyl)benzene and 3,3-bis(3-methyl-4-hydroxyphenyl)-2-oxo-2,3-dihydroindole.

The amount of any branching agents to be used is preferably 0.05 mol % to 2.00 mol %, based on moles of dihydroxyaryl compounds used in each case.

The branching agents can either form an initial charge with the dihydroxyaryl compounds and the chain terminators in the aqueous alkaline phase or can be added, dissolved in an organic solvent, before the phosgenation. In the case of the transesterification method, the branching agents are used together with the dihydroxyaryl compounds.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane, and also homo- or copolycarbonates derived from the diphenols of formulae (I), (II) and/or (III)

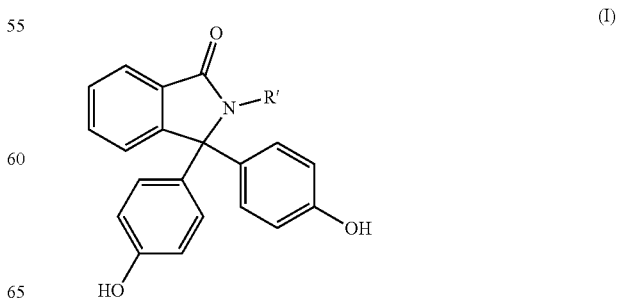

(I)

-continued

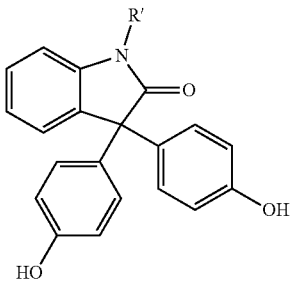

(II)

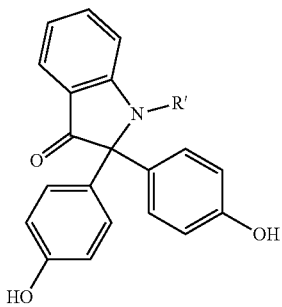

(III)

in which each R' is $C_1$- to $C_4$-alkyl, aralkyl or aryl, preferably methyl or phenyl, most preferably methyl, in particular with bisphenol A.

For incorporation of additives, component A is preferably used at least partly in the form of powders, pellets or mixtures of powders and pellets.

The polycarbonate preferably has an MVR of 5 to 20 cm³/(10 min), further preferably of 5.5 to 12 cm³/(10 min), determined according to ISO 1133:2012-03 at a testing temperature of 300° C. with a load of 1.2 kg.

The polycarbonate used may also be a mixture of different polycarbonates, for example of polycarbonates A1 and A2:

It is preferable when the amount of the aromatic polycarbonate A1 based on the total amount of polycarbonate is 25.0% to 85.0% by weight, preferably 28.0% to 84.0% by weight, more preferably 30.0% to 83.0% by weight, where this aromatic polycarbonate is based on bisphenol A and preferably has a melt volume flow rate MVR of 5 to 15 cm³/10 min, more preferably a melt volume flow rate MVR of 6 to 12 cm³/10 min, determined to ISO 1133 (test temperature 300° C., mass 1.2 kg, DIN EN ISO 1133-1: 2012-03).

It is preferable when the amount of the pulverulent aromatic polycarbonate A2 based on the total amount of polycarbonate is 2.0% to 12.0% by weight, preferably 3.0% to 11.0% by weight, more preferably 4.0% to 10.0% by weight, most preferably from 5.0% to 8.0% by weight, where this aromatic polycarbonate is preferably based on bisphenol A and has a preferred melt volume flow rate MVR of 12 to 65 cm³/10 min, further preferably has a melt volume flow rate MVR of 14 to 32 cm³/10 min, and more preferably has a melt volume flow rate MVR of 15 to 20 cm³/10 min.

The total amount of aromatic polycarbonate used in the build material is, for example, 50% to 98.5% by weight, preferably 80% to 98.0% by weight, further preferably 85% to 97.5% by weight, more preferably 90.0% to 97.5% by weight, most preferably 93.0% by weight to 97.5% by weight.

Component B

Component B are interference pigments and/or pearlescent pigments from the group of the metal oxide-coated micas. The mica may be naturally occurring or synthetically produced mica, the latter being preferable owing to its typically higher purity. Mica which is obtained from nature is typically accompanied by further minerals. The mica is preferably muscovite-based, i.e. it preferably comprises at least 60% by weight, further preferably at least 70% by weight, even further preferably at least 85% by weight, especially preferably at least 90% by weight, of muscovite, based on the total weight of the mica proportion—without metal oxide coating—in the interference and/or pearlescent pigment.

The metal oxide coating preferably comprises one or more coating layers comprising titanium dioxide, tin oxide, aluminum oxide and/or iron oxide, wherein the metal oxide is more preferably iron(III) oxide ($Fe_2O_3$), iron(II, III) oxide ($Fe_3O_4$, a mixture of $Fe_2O_3$ and FeO) and/or titanium dioxide, particularly preferably titanium dioxide. The metal oxide coating is thus most preferably a titanium dioxide coating.

The proportion of the titanium dioxide in the total weight of the pigment is preferably 30% to 60% by weight, even further preferably 35% to 55% by weight, and the proportion of the mica is preferably 40% to 70% by weight, even further preferably 45% to 65% by weight.

Preferred titanium dioxides are rutile and/or anatase. In a further preferred embodiment, the pearlescent pigment and/or interference pigment B) from the group of the metal oxide-coated micas present is anatase- or rutile-coated mica.

Preferably at least 90% by weight, further preferably at least 95% by weight, even further preferably at least 98% by weight, of pigment component B is anatase- and/or rutile-coated mica.

In order to increase the compatibility with the polymer matrix composed of polycarbonate, the pigment has preferably additionally been provided with a silicate coating, especially a sol-gel coating. "Silicate coating" is understood in accordance with the invention especially also to mean a coating composed of silicon dioxide. This typically also increases the weathering resistance and chemical stability of the pigment.

The median particle size (D50) of the pigment, determined by means of laser diffractometry on an aqueous slurry of the pigment, is preferably between 1 and 100 μm, in the case of synthetic mica further preferably between 5 and 80 μm and in the case of natural mica further preferably between 3 and 30 μm, generally in the case of mica more preferably between 3.5 and 15 μm, even more preferably 4.0 to 10 μm, exceptionally preferably 4.5 to 8.0 μm. The D90, likewise determined by means of laser diffractometry on an aqueous slurry of the pigment, in the case of synthetic mica is preferably from 10 to 150 μm and in the case of natural mica preferably from 5 to 80 μm. The density of the pigment is preferably 2.5 to 5.0 g/cm³, more preferably 2.8 to 4.0 g/cm³, determined according to DIN EN ISO 1183-1:2013-04.

The proportion of the at least one metal oxide-coated mica in the overall polycarbonate-based composition is 0.8% by weight to ≤3.0% by weight, preferably 1.0% by weight to 2.5% by weight, more preferably 1.2% by weight to 2.0% by weight.

Component C

Component C is an anhydride-modified α-olefin polymer.

The α-olefin polymer is preferably based on at least one monomer selected from the group consisting of ethylene, 1-propene, 1-butene, 1-isobutene, 1-pentene, 1-hexene, 1-heptene, 1-octene, 1-nonene, 1-decene, 1-undecene, 1-dodecene, 1-tridecene, 1-tetradecene, 1-octadecene, 1-nonadecene, but may alternatively be based on mixtures of these monomers. Further preferably, the α-olefin polymer is based on at least one monomer selected from the group consisting of ethene, propene, 1-hexene, 1-octene. More preferably, the α-olefin polymer is based on ethylene, propene and/or 1-octene.

"Based on" in this context means that preferably at least 90% by weight, further preferably at least 95% by weight, more preferably at least 98% by weight, based on the total weight of the respective α-olefin polymer in the polycarbonate-containing composition, of the α-olefin polymer has been formed from the respective monomer(s).

The α-olefin polymer has been modified with an anhydride, using an unsaturated carboxylic anhydride for the modification. The carboxylic anhydride is preferably selected from the group consisting of maleic anhydride, phthalic anhydride, fumaric anhydride, itaconic anhydride and mixtures thereof. Particular preference is given to maleic anhydride.

In a preferred embodiment, the anhydride-modified α-olefin polymer C) has been modified with maleic anhydride and is based on ethene, propene and/or 1-octene.

The anhydride-modified α-olefin polymer is preferably free of styrene-butadiene rubber, most preferably rubber-free.

Further preferably, component C comprises
C1) 90.0-99.5% by weight, preferably 92.0-97.5% by weight, further preferably 94.0-97.0% by weight, of α-olefin polymer and
C2) 0.5-10.0% by weight, further preferably 2.5-8.0% by weight, even further preferably 3.0-6.0% by weight, of anhydride.

The olefinic portion $C_1$) of the α-olefin polymer is most preferably characterized in that
the ethylene content is 65.0-96.0% by weight, further preferably 80.0-96.0% by weight, most preferably 84.0-92.0% by weight,
the propylene content is 2.0-10.0% by weight, most preferably 4.0-8.0% by weight, and
the 1-octene content is 2.0-25.0% by weight, further preferably 2.0-10.0% by weight, most preferably 4.0-8.0% by weight.

Most preferably, the α-olefin polymer is not based on any other monomers.

In an embodiment which is in accordance with the invention but is less preferred than a combination of ethene, propene and 1-octene, the olefinic portion C1) of the alpha-olefin polymer is based on propylene and/or ethylene, and in another embodiment on propylene only, most preferably to an extent of at least 98% by weight.

The average molecular weight $M_w$ of the anhydride-modified α-olefin polymer is preferably 300 to 40 000 g/mol, further preferably 800 to 32 000 g/mol, even further preferably 1000 to 15 000 g/mol, more preferably 1000 to 8000 g/mol, most preferably 3000 to 6000 g/mol. The molecular weight $M_w$ is determined by means of gel permeation chromatography in ortho-dichlorobenzene at 150° C. with polystyrene calibration. The value reported here is preferably the mean from a double determination.

In a further preferred embodiment, the anhydride-modified α-olefin polymer C) has an average molecular weight $M_w$, determined by means of gel permeation chromatography in ortho-dichlorobenzene at 150° C. with polystyrene calibration, of ≥1000 to ≤15 000 g/mol.

Most preferably, the anhydride-modified α-olefin polymer of component C is based on ethene, propene and 1-octene, is maleic anhydride-modified, and further preferably has an average molecular weight $M_w$, determined by means of gel permeation chromatography in ortho-dichlorobenzene at 150° C. with polystyrene calibration, of 1000 to 8000 g/mol, even further preferably 3000 to 6000 g/mol.

The amount of anhydride-modified α-olefin polymer in the overall composition is 0.05% by weight to ≤3% by weight, preferably 0.1% by weight to 2.0% by weight, further preferably 0.15% by weight to 1.5% by weight, more preferably 0.2% by weight to ≤1% by weight.

The method can be conducted in such a way that a build chamber in which the article is built has to be heated only to a lesser degree, if at all. In that case, it is possible to reduce or entirely avoid thermal component deformations ("warping").

For incorporation of additives, the polycarbonate polymer is preferably used in the form of powders, granules or mixtures of powders and granules. The build material may comprise further additives and/or fillers (for example glass or carbon fibers, silicates, talc, titanium dioxide, or barium sulfate), demolding agents and/or flame retardants, organic and inorganic light-scattering agents, stabilizers (for example thermal stabilizers and/or light stabilizers) and the like, but also further polymers. The total content of additives in the build material may, for example, be ≥0.01% by weight to ≤10% by weight, preferably ≥0.1% by weight to ≤8% by weight, more preferably 6% by weight. The content of fillers may, for example, be ≥0.0% by weight to ≤50% by weight, preferably ≥3% by weight to ≤40% by weight.

In a further preferred embodiment, the build material further comprises D) ≥0.001% by weight to ≤0.500% by weight, based on the total weight of the build material, of one or more phosphorus-containing thermal stabilizers, and the sum total of the percentages by weight of A), B), C) and D) is ≤100% by weight.

Component D

The build material preferably comprises at least one phosphorus-containing thermal stabilizer, further preferably a phosphine- and/or phosphite-containing thermal stabilizer. "Phosphorus-containing" here means that phosphorus is not present in some form as a mere impurity in component D, but that the structural formula of the thermal stabilizer includes a phosphorus atom.

Preferred compositions of the invention comprise at least one phosphine-based stabilizer, at least one phosphite-based stabilizer and at least one stabilizer from the group of the phenolic antioxidants, which constitute a particularly good stabilizer combination.

Alternatively preferred compositions of the invention comprise at least one phosphine-based stabilizer, at least one phosphonite-based, especially diphosphonite-based, stabilizer, and at least one stabilizer from the group of the phenolic antioxidants.

The compositions of the invention preferably contain 0.001% to 0.500% by weight, preferably 0.05% by weight to 0.270% by weight, of one or more phosphorus-containing thermal stabilizers.

Phosphines in the context of the present invention derive from compounds of the general $P_nH_{n+2}$ type, especially from $PH_3$, where preferably all hydrogen atoms have been replaced by aliphatic and/or aromatic hydrocarbyl radicals, where the aromatic hydrocarbyl radicals may have further substituents, for example alkyl groups, in branched and/or unbranched form. The phosphines here may have one phosphorus atom or else multiple phosphorus atoms bridged via corresponding aliphatic and/or aromatic hydrocarbons.

Phosphites in the context of the present invention are understood to mean esters of phosphonic acid (often also referred to as phosphorous esters) having the general structure P(OR)₃ where R represents aliphatic and/or aromatic hydrocarbyl radicals, where the aromatic hydrocarbyl radicals may have further substituents, for example alkyl groups, in branched and/or unbranched form.

Phosphonates are understood to mean compounds derived from the basic structure R—PO(OH)₂ where R represents aliphatic and/or aromatic hydrocarbyl radicals, where the aromatic hydrocarbyl radicals may have further substituents, for example branched and/or unbranched alkyl groups. The OH groups of the basic structure may have been partly or fully esterified to give OR functionalities where R in turn represents aliphatic and/or aromatic hydrocarbyl radicals, where the aromatic hydrocarbyl radicals may have further substituents, for example alkyl groups, in branched and/or unbranched form, or may have been partly or fully deprotonated, where the negative overall charge is balanced by a corresponding counterion.

Phosphonites in the context of the present invention are understood to mean esters, especially diesters, of phosphonous acid of the R—P(OR)₂ type where R represents aliphatic and/or aromatic hydrocarbyl radicals, where the aromatic hydrocarbyl radicals may have further substituents, for example alkyl groups, in branched and/or unbranched form. The phosphonites here may have one phosphorus atom or else multiple phosphorus atoms bridged via corresponding aliphatic and/or aromatic hydrocarbons.

The R radicals in one compound may be the same or different in each case.

There are no restrictions with regard to the selection of the phosphines, the phosphine compounds preferably being selected from the group comprising aliphatic phosphines, aromatic phosphines and aliphatic-aromatic phosphines.

The phosphine compounds may be primary, secondary and tertiary phosphines. Preference is given to using tertiary phosphines, particular preference being given to aromatic phosphines and very particular preference to tertiary aromatic phosphines.

Preference is given to using triphenylphosphine (TPP), trialkylphenylphosphine, bisdiphenylphosphinoethane or a trinaphthylphosphine, among which very particular preference is given to triphenylphosphine (TPP), or mixtures of these phosphines.

It is in principle possible to use mixtures of different phosphines.

The preparation and properties of phosphine compounds are known to those skilled in the art and are described, for example, in EP 0 718 354 A2 and "Ullmanns Enzyklopadie der Technischen Chemie" [Ullmann's Encyclopedia of Industrial Chemistry], 4th ed., vol. 18, p. 378-398 and Kirk-Othmer, 3rd ed., vol. 17, p. 527-534.

In respect of the use amount of the phosphine compound in the stabilizer mixture, it should be taken into account that the substance can be oxidized under particular processing conditions depending on temperature and residence time. The oxidized fraction is no longer available for stabilization. Therefore, the number of processing steps and the respective processing conditions should be taken into account. After thermal processing, the composition thus also always comprises certain amounts of oxidized phosphine, especially preferably triphenylphosphine oxide.

Preferably, the amount of phosphine stabilizer in the end product is >0.01% by weight, further preferably >0.02% by weight.

Preferably 0.03% to 0.500% by weight, further preferably 0.04% to 0.07% by weight, of phosphine is added to the compositions of the invention.

Available phosphite stabilizers that are suitable in the context of the present invention are, for example, Irgafos® 168 (tris(2,4-di-tert-butylphenyl) phosphite/CAS No. 31570-04-4), Irgafos® TPP (CAS No. 101-02-0), ADK PEP Stab 36 (CAS No. 80693-00-1) and Irgafos® TNPP (CAS No. 26523-78-4), particular preference being given to Irgafos® 168.

The group of antioxidants especially includes the sterically hindered phenols. Possible sterically hindered phenols are, for example, n-octadecyl 3-(3,5-di-t-butyl-4-hydroxyphenyl)propionate or esters of β-(5-tert-butyl-4-hydroxy-3-methylphenyl)propionic acid or β-(3,5-dicyclohexyl-4-hydroxyphenyl)propionic acid with mono- or polyhydric alcohols, for example with methanol, ethanol, butanol, n-octanol, i-octanol, n-octadecanol, hexane-1,6-diol, nonane-1,9-diol, ethylene glycol, propane-1,2-diol, neopentyl glycol, diethylene glycol, triethylene glycol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Particularly suitably, the sterically hindered phenol used is n-octadecyl 3-(3,5-di-t-butyl-4-hydroxyphenyl)propionate. The sterically hindered phenol is preferably used in amounts of 0.01% to 0.1% by weight, preferably 0.015% to 0.06% by weight, based on the total weight of the composition.

Commercially available suitable phenolic antioxidants are, for example, Irganox® 1076 (CAS No. 2082-79-3/2,6-di-tert-butyl-4-(octadecanoxycarbonylethyl)phenol) and Irganox® 1010 (CAS No. 6683-19-8).

The stabilizer combination preferably comprises
  a) 10% by weight-89% by weight, further preferably 20% by weight-78% by weight and especially preferably 30% by weight-67% by weight of at least one phosphine stabilizer,
  b) 10% by weight-89% by weight, further preferably 20% by weight-78% by weight and especially preferably 30% by weight-67% by weight of at least one phosphite stabilizer, and
  c) 1% by weight-50% by weight, further preferably 2% by weight-40% by weight and especially preferably 3% by weight-20% by weight of at least one phenolic antioxidant, wherein the components a)-c) sum to 100% by weight.

In a particularly preferred embodiment, the stabilizer combination consists of triphenylphosphine, Irganox 1076® and bis(2,6-di-t-butyl-4-methylphenyl)pentaerythrityl diphosphite or of triphenylphosphine, Irganox 1076® and Hostanox® P-EPQ®, which comprises a diphosphonite as the main component.

As an alternative to Irganox 1076®, it is possible to use Irganox® 1010 (pentaerythritol 3-(4-hydroxy-3,5-di-tert-butylphenyl)propionate; CAS No.: 6683-19-8).

The proportion of the stabilizer combination in the overall composition is 0.001% by weight-0.500% by weight, preferably 0.005% by weight-0.300% by weight, further preferably 0.05 to 0.270% by weight, especially preferably 0.15% by weight-0.25% by weight, based on the total weight of the composition.

In a preferred embodiment, the ratio of phosphite stabilizer to phenolic antioxidant is from 1:5 to 10:1, further preferably from 1:5 to 5:1 and especially preferably 4:1.

In a further preferred embodiment, the ratio of phosphine (a) to the mixture of phosphite and phenolic antioxidant (b+c) is preferably 8:1 to 1:9, further preferably 1:5 to 5:1, where the ratio of phosphite stabilizer (b) to phenolic antioxidant (c) is from 1:5 to 10:1, further preferably from 1:5 to 5:1 and especially preferably 4:1.

In order to stabilize the thermoplastic matrix, it is possible to use further phosphorus-based stabilizers, provided that they do not adversely affect the above-described stabilization.

In a further preferred embodiment, the build material further comprises E) >0% by weight to ≤7% by weight, based on the total weight of the build material, of further additives selected from the group consisting of flame retardants, anti-dripping agents, thermal stabilizers other than component D), impact modifiers, fillers, antistats, colorants, pigments other than component B, also including carbon black, lubricants, demolding agents, hydrolysis stabilizers, compatibilizers, UV absorbers and/or IR absorbers, and the sum total of the percentages by weight of A), B), C), D) and E) is ≤100% by weight.

Component E

The build material may also comprise, as further additives, one or more of the additives that are customary for polycarbonate compositions, such as flame retardants, anti-dripping agents, impact modifiers, fillers, antistats, colorants, pigments other than component B, also including carbon black, thermal stabilizers other than component D, lubricants and/or demolding agents, UV absorbers, IR absorbers, hydrolysis stabilizers and/or compatibilizers. The group of the further additives does not include any pigments according to component B, i.e. any pearlescent pigments and/or interference pigments from the group of the metal oxide-coated micas, and does not include any anhydride-modified α-olefin polymers, since these are designated as component C. The group of the further additives of component E also does not comprise any phosphorus-containing thermal stabilizers, since these are already covered by the optionally present component D.

The amount of further additives is preferably up to 5% by weight, more preferably 0.01% to 3% by weight, most preferably up to 1% by weight, based on the overall composition.

Particularly suitable demolding agents for the compositions of the invention are pentaerythritol tetrastearate (PETS) or glycerol monostearate (GMS), carbonates thereof and/or mixtures of these demolding agents.

Colorants or pigments in the context of the present invention of component E are, for example, sulfur-containing pigments such as cadmium red and cadmium yellow, iron cyanide-based pigments such as Prussian blue, oxide pigments such as titanium dioxide, zinc oxide, red iron oxide, black iron oxide, chromium oxide, titanium yellow, zinc/iron-based brown, titanium/cobalt-based green, cobalt blue, copper/chromium-based black and copper/iron-based black or chromium-based pigments such as chromium yellow, phthalocyanine-derived dyes such as copper phthalocyanine blue and copper phthalocyanine green, fused polycyclic dyes and pigments such as azo-based (e.g. nickel azo yellow), sulfur indigo dyes, perinone-based, perylene-based, quinacridone-derived, dioxazine-based, isoindolinone-based and quinophthalone-derived derivatives, anthraquinone-based heterocyclic systems, but in any case no pearlescent pigments and/or interference pigments from the group of the metal oxide-coated micas.

Specific examples of commercial products are, for example, MACROLEX® Blue RR, MACROLEX® Violet 3R, MACROLEX® EG, MACROLEX® Violet B (Lanxess AG, Germany), Sumiplast® Violet RR, Sumiplast® Violet B, Sumiplast® Blue OR, (Sumitomo Chemical Co., Ltd.), Diaresin® Violet D, Diaresin® Blue G, Diaresin® Blue N (Mitsubishi Chemical Corporation), Heliogen® Blue or Heliogen® Green (BASF AG, Germany).

Among these, preference is given to cyanine derivatives, quinoline derivatives, anthraquinone derivatives, phthalocyanine derivatives.

The employed carbon blacks are preferably nanoscale carbon blacks, more preferably nanoscale pigment blacks. These preferably have an average primary particle size, determined by scanning electron microscopy, of less than 100 nm, preferably of 10 to 99 nm, more preferably of 10 to 50 nm, particularly preferably of 10 to 30 nm, especially of 10 to 20 nm. The finely divided pigment blacks are particularly preferred.

Commercially available carbon blacks that are suitable in the context of the invention are obtainable in a multitude of trade names and forms, such as pellets or powders. For instance, suitable carbon blacks are available under the BLACK PEARLS® trade names, as wet-processed pellets under the ELFTEX®, REGAL® and CSX® names, and in a flaky form as MONARCH®, ELFTEX®, REGAL® and MOGUL®, all from Cabot Corporation. Especially preferred are carbon blacks that are traded under the BLACK PEARLS® trade name (CAS No. 1333-86-4).

The composition optionally comprises an ultraviolet absorber. Suitable ultraviolet absorbers are compounds having minimum transmittance below 400 nm and maximum transmittance above 400 nm. Such compounds and the preparation thereof are known from the literature and are described, for example, in EP 0 839 623 A1, WO 1996/15102 A2 and EP 0 500 496 A1. Ultraviolet absorbers particularly suitable for use in the composition of the invention are benzotriazoles, triazines, benzophenones and/or arylated cyanoacrylates.

The following ultraviolet absorbers are suitable for example: hydroxybenzotriazoles, such as 2-(3',5'-bis(1,1-dimethylbenzyl)-2'-hydroxyphenyl)benzotriazole (Tinuvin® 234, BASF AG, Ludwigshafen), 2-(2'-hydroxy-5'-(tert-octyl)phenyl)benzotriazole (Tinuvin® 329, BASF AG, Ludwigshafen), 2-(2'-hydroxy-3'-(2-butyl)-5'-(tert-butyl)phenyl)benzotriazole (Tinuvin® 350, BASF AG, Ludwigshafen), bis(3-(2H-benzotriazolyl)-2-hydroxy-5-tert-octyl)methane, (Tinuvin® 360, BASF AG, Ludwigshafen), (2-(4,6-diphenyl-1,3,5-triazin-2-yl)-5-(hexyloxy)phenol (Tinuvin® 1577, BASF AG, Ludwigshafen), the benzophenones 2,4-dihydroxybenzophenone (Chimasorb® 22, BASF AG, Ludwigshafen) or 2-hydroxy-4-(octyloxy)benzophenone (Chimassorb® 81, BASF AG, Ludwigshafen), 2-cyano-3,3-diphenyl-2-propenoic acid, 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, BASF AG, Ludwigshafen) or tetraethyl 2,2'-(1,4-phenylenedimethylidene)bismalonate (Hostavin® B-Cap, Clariant AG). It is also possible to use mixtures of these ultraviolet absorbers.

Suitable IR absorbers are disclosed, for example, in EP 1 559 743 A1, EP 1 865 027 A1, DE 10 022 037 A1 and DE 10 006 208 A1. Of the IR absorbers mentioned in the literature cited, preference is given to those based on boride and tungstate, especially cesium tungstate or zinc-doped cesium tungstate, and also ITO- and ATO-based absorbers and combinations thereof.

Impact modifiers present may be standard impact modifiers. This group comprises both core/shell-based systems such as ABS, MBS, acrylic-based, silicone/acrylic-based impact modifiers, but also non-core/shell-based impact modifiers.

Organic and inorganic fillers may be added to the polycarbonate composition in customary amounts. Suitable materials in principle include all finely ground organic and inorganic materials. These may have a particulate, flaky or fibrous character for example. Examples of these include chalk, quartz powder, titanium dioxide, silicates/aluminosilicates, for example talc, wollastonite, montmorillonite, especially also in an organophilic form modified by ion exchange, kaolin, zeolites, vermiculite, and also aluminum oxide, silica, magnesium hydroxide and aluminum hydroxide. It is also possible to use mixtures of different inorganic materials.

Preferred inorganic fillers are ultrafinely divided (nanoscale) inorganic compounds composed of one or more metals of main groups 1 to 5 and transition groups 1 to 8 of the Periodic Table, preferably from main groups 2 to 5, more preferably of main groups 3 to 5, or of transition groups 4 to 8, comprising the elements oxygen, sulfur, boron, phosphorus, carbon, nitrogen, hydrogen and/or silicon.

Preferred compounds are, for example, oxides, hydroxides, water-containing/basic oxides, sulfates, sulfites, sulfides, carbonates, carbides, nitrates, nitrites, nitrides, borates, silicates, phosphates and/or hydrides.

The anti-dripping agent used is preferably polytetrafluoroethylene (PTFE).

Build materials that are particularly preferred in accordance with the invention are those comprising
A) 90.0% by weight to 97.5% by weight, preferably 93.0% by weight to 97.5% by weight, of aromatic polycarbonate, preferably having an MVR of 5 to 20 cm$^3$/(10 min), determined according to ISO 1133:2012-03 at a testing temperature of 300° C. with a load of 1.2 kg,
B) 1.0% to 2.5% by weight, preferably 1.2% to 2.0% by weight, of pearlescent pigment and/or interference pigment from the group of the titanium dioxide-coated micas, more preferably comprising at least 98% by weight of anatase-coated mica,
C) 0.1% by weight to 2.0% by weight of anhydride-modified α-olefin polymer, preferably based on ethene, propene and/or 1-octene, more preferably maleic anhydride-modified,
D) 0.001% by weight to 0.500% by weight, preferably 0.05 to 0.270% by weight, of one or more phosphorus-containing thermal stabilizers, preferably comprising
    i) phosphine, phosphite and phenolic antioxidant or
    ii) phosphine, phosphonite and phenolic antioxidant,
E) up to 7% by weight, preferably up to 5% by weight, more preferably 0.1 to 3% by weight, most preferably up to 1% by weight, of further additives, exceptionally preferably selected from the group consisting of flame retardants, anti-dripping agents, impact modifiers, fillers, antistats, colorants, pigments other than component B, also including carbon black, thermal stabilizers other than component D, lubricants and/or demolding agents, hydrolysis stabilizers, compatibilizers, UV absorbers and/or IR absorbers.

According to the invention, "up to" in each case includes the value that follows these words as the upper limit.

The group of further additives according to component E most preferably consists solely of colorants, demolding agents, pigments other than component B, especially carbon black, and/or thermal stabilizers other than component D.

Build materials that are most preferred in accordance with the invention comprise
A) 90.0% by weight to 97.5% by weight of aromatic polycarbonate, preferably having an MVR of to 18 cm$^3$/(10 min), determined according to ISO 1133:2012-03 at a testing temperature of 300° C. with a load of 1.2 kg,
B) 1.2 to 2.0% by weight, preferably 1.5 to 2.0% by weight, of pearlescent pigment and/or interference pigment from the group of the titanium dioxide-coated micas, exceptionally preferably comprising at least 98% by weight of anatase-coated mica,
C) 0.2% by weight to ≤1% by weight of anhydride-modified α-olefin polymer based on ethene, propene and 1-octene, more preferably maleic anhydride-modified, exceptionally preferably with an $M_w$ of 3000 g/mol to 6000 g/mol, determined by means of gel permeation chromatography in ortho-dichlorobenzene at 150° C. with polystyrene calibration,
D) 0.05% by weight to 0.270% by weight, exceptionally preferably 0.15% by weight to 0.25% by weight, of one or more phosphorus-containing thermal stabilizers comprising, exceptionally preferably consisting of,
    i) phosphine, phosphite and phenolic antioxidant or
    ii) phosphine, phosphonite and phenolic antioxidant,
E) up to 7% by weight, preferably up to 3% by weight, exceptionally preferably up to 1% by weight, of further additives, exceptionally preferably selected from the group consisting of colorants, lubricants, demolding agents, pigments other than component B, especially carbon black, and/or thermal stabilizers other than component D.

The build materials exceptionally preferably do not contain any further components.

In a further preferred embodiment, the production of the article by means of the additive manufacturing method comprises the steps of:
applying a layer of particles including the build material to a target surface;
introducing energy into a selected portion of the layer corresponding to a cross section of the article such that the particles in the selected portion are bonded;
repeating the steps of applying and introducing energy for a multitude of layers, such that the bonded portions of the adjacent layers become bonded in order to form the article.

This embodiment is a powder sintering or powder fusion method. If the number of repetitions for application and irradiation is sufficiently small, the article that is to be built can also be described as two-dimensional. This type of two-dimensional article can also be characterized as a coating. For example, for building thereof, ≥2 to ≤20 repetitions can be performed for application and irradiation.

It is preferable that at least 90% by weight of the particles have a particle diameter of ≤0.25 mm, preferably ≤0.2 mm, more preferably ≤0.15 mm. The energy source for joining the particles may be electromagnetic energy, for example UV to IR light. An electron beam is also conceivable. The bonding of the particles in the irradiated portion of the particle layer is typically effected through (partial) melting of a (semi)crystalline material and bonding of the material in the course of cooling. Alternatively, it is possible that other transformations of the particles such as a glass transition, i.e. the heating of the material to a temperature above the glass transition temperature, bring about bonding of the particles to one another.

In a further preferred embodiment, the introducing of energy into a selected portion of the layer corresponding to a cross section of the article such that the particles in the selected portion are bonded comprises the following step:

irradiating a selected portion of the layer corresponding to a cross section of the article with an energy beam to bond the particles in the selected portion.

This form of the method can be regarded as a selective sintering method, especially as a selective laser sintering method (SLS). The energy beam for joining the particles may be a beam of electromagnetic energy, for example a "light beam" of UV to IR light. The energy beam is preferably a laser beam, more preferably having a wavelength between 600 nm and 15 µm. The laser may take the form of a semiconductor laser or of a gas laser. An electron beam is also conceivable. Preferably, the energy is introduced by means of an IR laser, and so the at least temporary exposure of the build material envisaged in accordance with the invention with infrared radiation in the wavelength range between 600 nm and 1700 nm is also implemented thereby.

In a further preferred embodiment, the production of the article by means of the additive manufacturing method comprises the steps of:

applying a filament of an at least partly molten build material to a carrier, such that a layer of the build material is obtained, corresponding to a first selected cross section of the article;

applying a filament of the at least partly molten build material to a previously applied layer of the build material, such that a further layer of the build material is obtained, which corresponds to a further selected cross section of the article and which is bonded to the layer applied beforehand;

repeating the step of applying a filament of the at least partly molten build material to a previously applied layer of the build material until the article has been formed.

This embodiment is a melt coating or fused deposition modeling (FDM) method. If the number of repetitions for the applying is sufficiently low, the two-dimensional article to be built may also be referred to as two-dimensional. Such a two-dimensional article can also be characterized as a coating. For example, for building thereof, ≥1 to ≤20 repetitions may be performed for the application.

The individual filaments which are applied may have a diameter of ≥30 µm to ≤2000 µm, preferably ≥40 µm to ≤1000 µm and more preferably ≥50 µm to ≤500 µm.

The first step of this embodiment of the method relates to the building of the first layer on a carrier. Subsequently, the second step, in which further layers are applied to previously applied layers of the build material, is executed until the desired end result in the form of the article is obtained. The at least partly molten build material bonds to existing layers of the material in order to form a structure in z direction. But it is possible that just one layer of the build material is applied to a carrier. In this embodiment, the layer of the build material applied last in each case is preferably exposed to the IR radiation envisaged in accordance with the invention by means of an IR radiation source such as a Nernst pin, globar, chromium-nickel alloys, high-pressure mercury vapor lamps or tungsten lamps.

In a further preferred embodiment, the method is conducted within a build chamber and the temperature of the build chamber is ≥10° C. (preferably ≥25° C., more preferably ≥50° C.) lower than the glass transition temperature $T_g$ of the build material (determined by DSC to ISO 11357-2:2013-05 at a heating rate of 10° C./min). Particularly in the case of complex and large components with long manufacturing time, this is associated with distinctly lower thermal stress and better trueness of the component to scale. In powder sintering methods, the powders can be processed at distinctly lower build chamber temperature. Thus, unwanted sintering of powder beneath the (activated) surface can be avoided.

In a further preferred embodiment, the surface temperature of a layer of the build material applied last in the additive manufacturing method is not less than a temperature which, in a dynamic-mechanical analysis of the build material (to ISO 6721-10:2015-09 at an angular frequency of 1/s), corresponds to a point of intersection of a theoretical straight line in the section of the curve of the storage modulus E' corresponding to a vitreous state of the build material and a theoretical straight line in the section of the curve of the storage modulus E' in which the storage modulus E' declines and indicates a glass transition. This temperature is also referred to in the literature as "onset" temperature in the determination of the glass transition temperature using the E' curve in a dynamic-mechanical analysis.

In a further preferred embodiment, during the method, the temperature of the build material deposited decreases from the surface down to lower layers. For instance, in a particularly preferred embodiment, the tenth layer beneath the uppermost layer has a temperature ≤3° C., preferably ≤5° C. and more preferably ≤8° C. below the temperature of the uppermost layer.

In a further preferred embodiment, a multitude of build materials is used, and at least one of the build materials is defined as set out above. At least one of the build materials preferably does not contain component B), and the build material comprising component B) is processed to give an information feature.

A further aspect of the present invention is an article obtained by a method of the invention, wherein the article has been produced at least partly from a build material as set out above, and wherein the article, in build direction of the additive manufacturing method used in the production thereof, has a tensile strength (ISO 527:2012-02) of ≥30% (preferably ≥40%, more preferably ≥50%) to ≤100% of the tensile strength (ISO 527:2012-02) of an injection-molded test specimen made of the same build material. These tensile strengths in the additively manufactured article thus relate to the adhesion of individual layers of the build material to one another.

In a preferred embodiment, the article comprises a multitude of build materials, at least one of the build material does not contain component B), and the build material defined as set out above takes the form of an information feature. The information feature may, for example, be a product identifier or an antiforgery feature. This may be implemented in the form of barcodes or QR codes. For this purpose, the information feature need not be at the outer surface of the article, but may also be embedded within the article. For suitability as information feature, it is possible to make use of the fact that the pigments of component B) have different absorption characteristics than non-pigment-containing build material in an x-ray image, under a terahertz scanner or else under intense light.

In a further preferred embodiment, the article is a housing, a prosthesis, a lampshade, a reflector or a decorative cover.

EXAMPLES

The invention is illustrated in detail by working examples hereinafter, without restriction thereto. The methods of determination described here are employed for all corresponding parameters in the present invention, in the absence of any statement to the contrary.

For the Charpy impact resistance tests (ISO 179 1 e U), flat specimens having dimensions of 80 mm×10 mm×4 mm were produced by the FDM method. Production conditions: nozzle diameter: 0.4 mm; print speed: 38 mm/s; layer thickness: 0.2 mm; nozzle temperature: 295° C.; print bed temperature: 100° C. The measurements were effected at 23° C.

For the tensile tests according to ISO 527-2:2012-02, corresponding S2 specimens were likewise produced by the FDM method. The build direction in each case is the Z direction.

The molecular weight was determined by means of gel permeation chromatography to DIN 55672-1:2007-08, calibrated against bisphenol A polycarbonate standards and using dichloromethane as eluent, by method 2301-0257502-09D (from 2009, in German) from Currenta GmbH & Co. OHG, Leverkusen; column combination of crosslinked styrene-divinylbenzene resins. Diameter of analytical columns: 7.5 mm; length: 300 mm. Particle sizes of column material: 3 μm to 20 μm. Concentration of solutions: 0.2% by weight. Flow rate: 1.0 ml/min, temperature of solutions: 30° C. Detection using a refractive index (RI) detector.

The build material for experiment no. 1-1 had the following composition: 97.51% by weight of an aromatic polycarbonate having Mw of about 24 000 g/mol, 0.08% by weight of a phosphite thermal stabilizer, 0.02% by weight of a phenolic antioxidant, 0.4% by weight of a maleic anhydride-modified polyolefin, 1.94% by weight of effect pigment based on $TiO_2$- and $Fe_2O_3$-coated mica and 0.05% by weight of organic colorant composition.

The build material for comparative experiment no. V-1 had the following composition: 97.48% by weight of an aromatic polycarbonate having Mw of about 31 000 g/mol, 0.4% by weight of an organic lubricant and demolding agent, 1.94% by weight of effect pigment based on $TiO_2$-coated mica and 0.18% by weight of organic colorant composition.

The build material for experiment no. 2-1 had the following composition: 97.38% by weight of an aromatic polycarbonate having Mw of about 31 000 g/mol, 0.08% by weight of a phosphite thermal stabilizer, 0.02% by weight of a phenolic antioxidant, 0.4% by weight of a maleic anhydride-modified polyolefin, 1.94% by weight of effect pigment based on $TiO_2$-coated mica and 0.18% by weight of organic colorant composition.

| Plane of examination of the test specimen | | Experiment No. | | | | | | | | |
|---|---|---|---|---|---|---|---|---|---|---|
| | | 1-1 | 1-1 | 1-1 | V1 | V1 | V1 | 2-1 | 2-1 | 2-1 |
| Test | Unit | X/Y | Y/Z | Z/Y | X/Y | Y/Z | Z/Y | X/Y | Y/Z | Z/Y |
| Charpy | | | | | | | | | | |
| Number of test specimens: broken/unbroken | | 5/0 | 5/0 | 5/0 | 5/0 | 5/0 | 5/0 | 3/2 | 3/2 | 5/0 |
| Average of broken test specimens | kJ/m² | 76 | 138 | 9 | 46 | 69 | 8 | 66 | 165 | 10 |
| Tensile test | | | | | | | | | | |
| Modulus of elasticity | N/mm² | 1510 | | 923 | 1720 | | 1060 | 2070 | | 1300 |
| Tensile strength | N/mm² | 42 | | 17 | 49 | | 22 | 57 | | 28 |
| Elongation at break | % | 6.5 | | 3.1 | 8.5 | | 3 | 8.5 | | 3.1 |
| GPC of material samples of the test specimens | | | | | | | | | | |
| $M_n$ | g/mol | | | 10320 | | | 10110 | | | 11650 |
| $M_w$ | g/mol | | | 23810 | | | 28170 | | | 31160 |
| $M_z$ | g/mol | | | 38420 | | | 47560 | | | 51090 |
| $M_w/M_n$ | | | | 2.30 | | | 2.78 | | | 2.67 |

It can be seen that a distinct reduction in polymer degradation was achievable in the case of test specimens of the invention. The formulations equipped with the novel stabilizers show virtually no breakdown in spite of repeated melting. A distinct increase in toughness is also found in the formulations of the invention compared to the standard formulation.

The invention claimed is:

1. A method of producing an article, comprising producing the article by means of an additive manufacturing method from a build material,
   wherein
   the build material, based on the total weight of the build material, comprises
   A) ≥50% by weight to ≤98.5% by weight of aromatic polycarbonate,
   B) ≥0.8% by weight to ≤3.0% by weight of interference pigment and/or pearlescent pigment from a group of metal oxide-coated micas and
   C) ≥0.05% by weight to ≤3% by weight of anhydride-modified α-olefin polymer,
   where the sum total of the percentages by weight of A), B) and C) is ≤100% by weight,
   wherein the build material A) comprises a polycarbonate having a weight-average molecular weight $M_w$ of ≥10 000 to ≤40 000 g/mol, determined by gel permeation chromatography in methylene chloride at 25° C. against polycarbonate standards.

2. The method as claimed in claim 1, wherein the pearlescent pigment and/or interference pigment B) from the group of the metal oxide-coated micas present is anatase- or rutile-coated mica.

3. The method as claimed in claim 1, wherein the anhydride-modified α-olefin polymer C) has been modified with maleic anhydride and is based on ethene, propene and/or 1-octene.

4. The method as claimed in claim 1, wherein the anhydride-modified α-olefin polymer C) has an average molecular weight $M_w$, determined by means of gel permeation chromatography in ortho-dichlorobenzene at 150° C. with polystyrene calibration, of ≥1000 to ≤15 000 g/mol and an acid number of ≥45 to ≤170 mg KOH/g, determined to DIN ISO 17025:2018-03 by means of potentiometric titration.

5. The method as claimed in claim 1, wherein the build material further comprises D) ≥0.001% by weight to ≤0.500% by weight, based on the total weight of the build material, of one or more phosphorus-containing thermal stabilizers, and the sum total of the percentages by weight of A), B), C) and D) is ≤100% by weight.

6. The method as claimed in claim 5, wherein the build material further comprises E) >0% by weight to ≤7% by weight, based on the total weight of the build material, of further additives selected from the group consisting of flame retardants, anti-dripping agents, thermal stabilizers other than component D), impact modifiers, fillers, antistats, colorants, pigments other than component B, also including carbon black, lubricants, demolding agents, hydrolysis stabilizers, compatibilizers, UV absorbers and/or IR absorbers, and the sum total of the percentages by weight of A), B), C), D) and E) is ≤100% by weight.

7. A method of producing an article, comprising producing the article by means of an additive manufacturing method from a build material,
wherein
the build material, based on the total weight of the build material, comprises
A) ≥50% by weight to ≤98.5% by weight of aromatic polycarbonate,
B) ≥0.8% by weight to ≤3.0% by weight of interference pigment and/or pearlescent pigment from a group of metal oxide-coated micas and
C) ≥0.05% by weight to ≤3% by weight of anhydride-modified α-olefin polymer,
where the sum total of the percentages by weight of A), B) and C) is ≤100% by weight,
wherein the production of the article by the additive manufacturing method comprises the steps of:
-applying a layer of particles including the build material to a target surface;
-introducing energy into a selected portion of the layer of particles corresponding to a cross section of the article such that the particles in the selected portion are bonded, thereby producing a bonded portion;
-repeating the steps of applying the layer of particles and introducing energy for a multitude of layers, such that the bonded portion of adjacent layers become bonded in order to form the article.

8. The method as claimed in claim 1, wherein a layer of the build material applied last in the additive manufacturing method has a surface temperature that is not less than a temperature which, in a dynamic-mechanical analysis of the build material (to ISO 6721-10:2015-09 at an angular frequency of 1/s), corresponds to a point of intersection of a theoretical straight line in the section of a curve of a storage modulus E' corresponding to a vitreous state of the build material and a theoretical straight line in the section of the curve of the storage modulus E' in which the storage modulus E' declines and indicates a glass transition.

9. The method as claimed in claim 1, wherein a multitude of build materials are used, and at least one of the multitude of build materials is the build material.

10. A method of producing an article, comprising producing the article by means of an additive manufacturing method from a build material,
wherein
the build material, based on the total weight of the build material, comprises
A) ≥50% by weight to ≤98.5% by weight of aromatic polycarbonate,
B) ≥0.8% by weight to ≤3.0% by weight of interference pigment and/or pearlescent pigment from a group of metal oxide-coated micas and
C) ≥0.05% by weight to ≤3% by weight of anhydride-modified a-olefin polymer,
where the sum total of the percentages by weight of A), B) and C) is ≤100% by weight,
wherein the production of the article by the additive manufacturing method comprises the steps of:
-applying a filament of an at least partly molten build material to a carrier, such that a layer of the build material is obtained, corresponding to a first selected cross section of the article;
-applying a filament of the at least partly molten build material to a previously applied layer of the build material, such that a further layer of the build material is obtained, which corresponds to a further selected cross section of the article and which is bonded to the layer applied beforehand;
-repeating the step of applying a filament of the at least partly molten build material to a previously applied layer of the build material until the article has been formed.

11. The method as claimed in claim 1, wherein the method is conducted within a build chamber, and the build chamber has a temperature that is ≥10° C. lower than the glass transition temperature $T_g$ of the build material (determined by DSC to ISO 11357-2:2013-05 at a heating rate of 10° C./min).

* * * * *